(12) United States Patent
Baldascini et al.

(10) Patent No.: US 7,197,954 B2
(45) Date of Patent: Apr. 3, 2007

(54) DOUBLE-CLUTCH TRANSMISSION ARCHITECTURE FOR A MOTOR VEHICLE

(75) Inventors: Filippo Baldascini, Orbassano (IT); Dario Caenazzo, Orbassano (IT); Domenico Mesiti, Orbassano (IT); Gianluigi Pregnolato, Orbassano (IT)

(73) Assignee: C.R.F. Societa Consortile per Azioni, Orbassano (IT)

(*) Notice: Subject to any disclaimer, the term of this patent is extended or adjusted under 35 U.S.C. 154(b) by 167 days.

(21) Appl. No.: 11/013,417

(22) Filed: Dec. 17, 2004

(65) Prior Publication Data

US 2005/0150318 A1    Jul. 14, 2005

(30) Foreign Application Priority Data

Dec. 18, 2003  (IT) .......................... TO2003A1023

(51) Int. Cl.
*F16H 3/08*    (2006.01)
(52) U.S. Cl. ....................................................... 74/331
(58) Field of Classification Search ............... 74/331, 74/330
See application file for complete search history.

(56) References Cited

U.S. PATENT DOCUMENTS

| | | |
|---|---|---|
| 4,544,057 A | 10/1985 | Webster et al. |
| 5,868,035 A | 2/1999 | Devaud |
| 5,916,326 A | 6/1999 | Tischer |
| 7,044,014 B2 * | 5/2006 | Janson et al. ................. 74/331 |
| 2005/0241424 A1 * | 11/2005 | Baldascini et al. ........... 74/331 |

FOREIGN PATENT DOCUMENTS

| | | |
|---|---|---|
| DE | 35 27 401 A1 | 2/1987 |
| DE | 35 27 401 A1 | 5/1987 |
| DE | 102 40 259 A1 | 6/2003 |
| EP | 1 245 863 A2 | 10/2002 |
| EP | 1 359 048 A2 | 11/2003 |
| EP | 1 369 613 A1 | 12/2003 |
| EP | 1 460 305 A1 | 9/2004 |
| EP | 1 544 505 A1 | 6/2005 |
| FR | 1 201 910 | 1/1960 |
| FR | 1 201 910 A | 1/1960 |

* cited by examiner

*Primary Examiner*—Dirk Wright
(74) *Attorney, Agent, or Firm*—Sughrue Mion, PLLC

(57) ABSTRACT

The transmission includes: a first input shaft carrying drive gearwheels for first gear, third gear, fifth gear, sixth gear and reverse; a second input shaft, coaxial to the first, carrying drive gearwheels for second gear and fourth gear; first and second clutches for coupling the first and the second input shafts respectively to a drive shaft of the motor vehicle; and at least one output shaft carrying a plurality of driven gearwheels, each meshing, either directly or indirectly, with a corresponding drive gearwheel; a first engagement sleeve associated with the drive gearwheels or driven gearwheels of first and third gears; a second engagement sleeve associated with the drive gearwheels or driven gearwheels of second and fourth gears; a third engagement sleeve associated with the drive gearwheels or driven gearwheels of fifth and sixth gears; and a fourth engagement sleeve associated with the drive gearwheel or driven gearwheel of reverse gear.

21 Claims, 8 Drawing Sheets

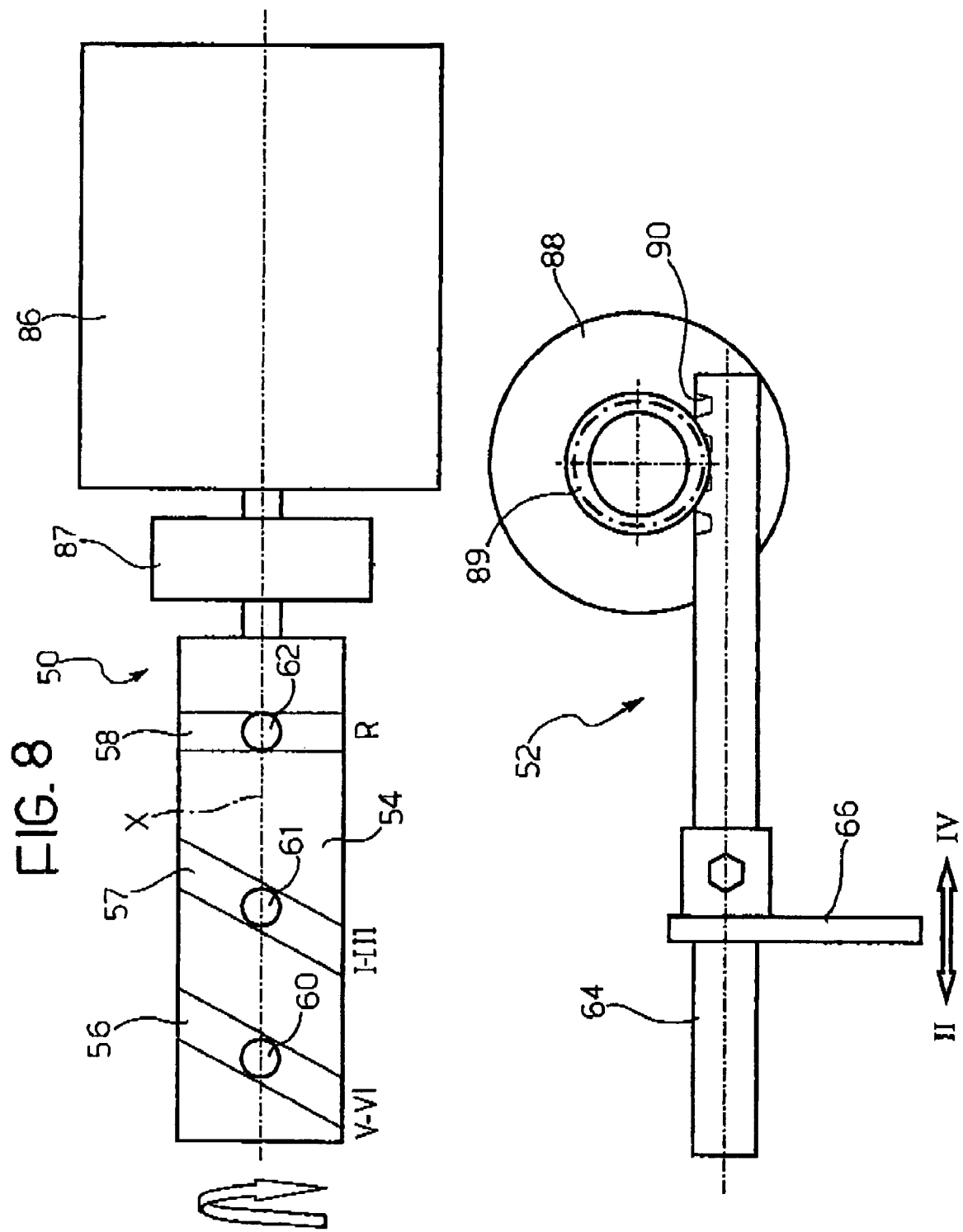

DOUBLE-CLUTCH TRANSMISSION ARCHITECTURE FOR A MOTOR VEHICLE

BACKGROUND OF THE INVENTION

The present invention relates to a double-clutch transmission architecture for a motor vehicle, having the characteristics specified in the preamble to claim 1.

A six speed transmission architecture of the type indicated above is known, for example, from European Patent Application EP-A-1 245 863, in the name of the Applicant. According to this known arrangement, the transmission includes:

- first and second coaxial input shafts and at least one output shaft;
- first and second clutches operable to couple the first and second input shafts respectively to a drive shaft;
- a first set of drive gearwheels associated with the odd gear ratios (first, third and fifth) and with the reverse gear, carried on the first input shaft;
- a second set of drive gearwheels associated with the even gear ratios (second, fourth and sixth), carried by the second input shaft;
- a plurality of driven gearwheels associated with the various gear ratios of the transmission, carried by the output shaft or shafts; and
- coupling means, such as slidable sleeves, operable to connect each of the drive wheels for rotation with the respective input shaft and/or one of the driven wheels with the respective output shaft.

SUMMARY OF THE INVENTION

It is an object of the present invention to provide a double-clutch transmission architecture for a motor vehicle, with six or more gear ratios, which has a simpler structure, takes up less space and has a lower manufacturing cost than the prior art discussed above.

This object is fully achieved by virtue of a transmission having the characteristics defined in the characterising portion of claim 1. Further advantageous characteristics of the invention are specified in the dependent claims.

Thanks to the configuration defined in claim 1, one slidable sleeve and its associated actuator are eliminated, and therefore the complexity, the dimensions and the manufacturing cost of the transmission are reduced. In addition, this configuration can easily be obtained from an ordinary single-clutch transmission, whether manual or robotised.

Such a configuration obviously does not permit to shift from the penultimate gear ratio to the last gear ratio, and vice-versa, in so-called power-shift mode, that is without interruption in the transmission of torque. This should be seen as acceptable however since, given the modest levels of acceleration to which the vehicle is subject, the "jerk" occurring upon shifting between these two gear ratios is limited and hence barely noticeable by the user.

BRIEF DESCRIPTION OF THE DRAWINGS

Further characteristics and advantages of the invention will become apparent from the detailed description which follows, given purely by way of non-limitative example, with reference to the appended drawings, in which:

FIG. 8 shows an example of an electromechanical control system for a transmission according to the invention.

DETAILED DESCRIPTION OF THE INVENTOR

Figure 1:
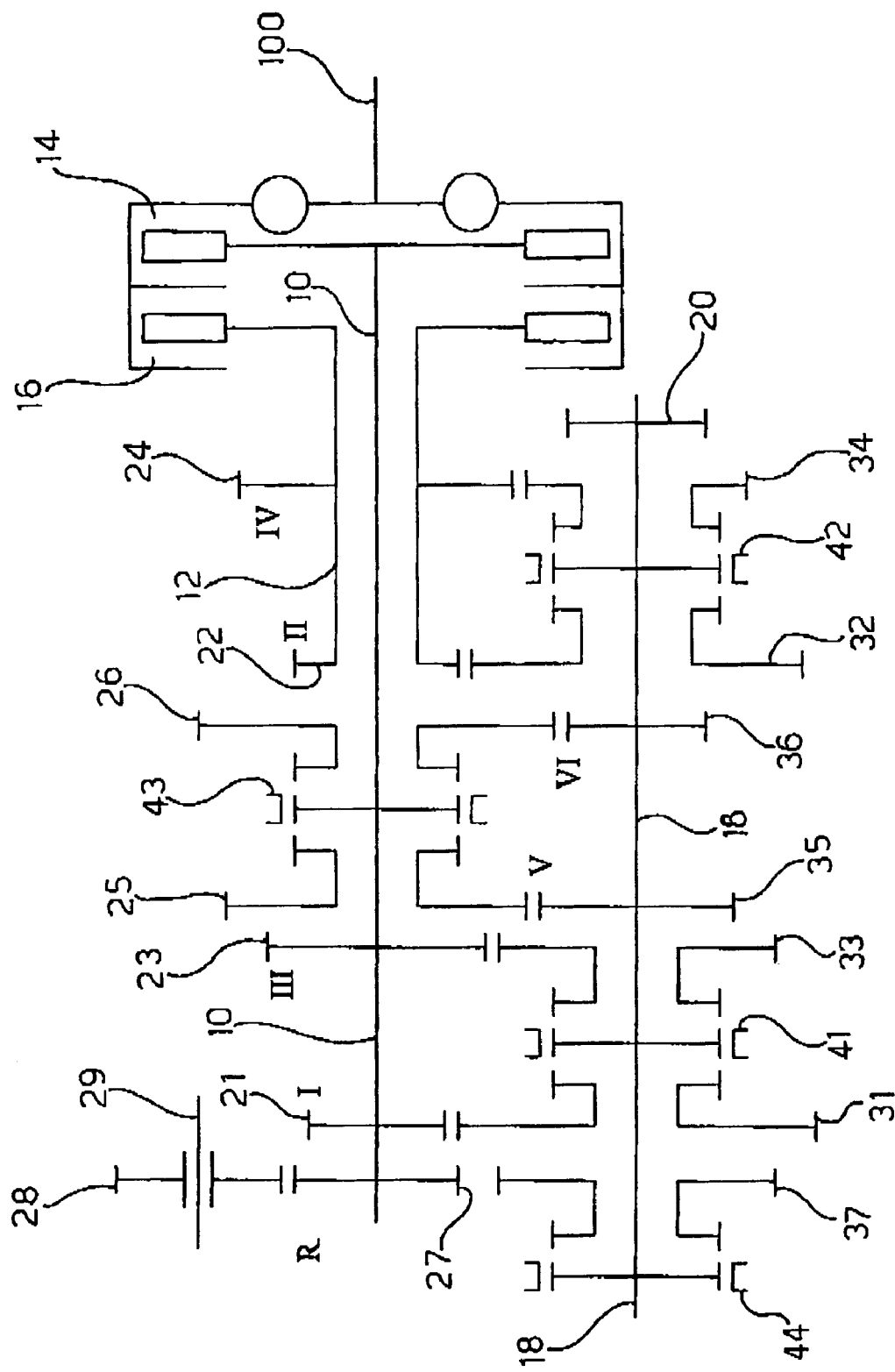
FIG. 1 is a diagram of a first preferred embodiment of a double-clutch six-speed transmission for a motor vehicle according to the invention, with a single output shaft.

For the sake of simplicity, the invention is described and illustrated with reference to its application to a six speed transmission, but it can obviously be applied also to transmissions with a higher number of gear ratios (in particular seven gear ratios).

In the drawings, the gear sets corresponding to the various forward gear ratios of the transmission are indicated by the Roman numbers I, II, II, IV, V and VI respectively for the first, second, third, fourth, fifth and sixth gear, while the reverse gear is indicated by the letter R.

With reference to FIG. 1, a double-clutch six-speed transmission for a motor vehicle, according to a first preferred embodiment of the invention basically includes:

a first input shaft 10;

a second input shaft 12, coaxial of the first shaft 10;

a first clutch 14, of a normally engaged type, operable to couple the first input shaft 10 to a drive shaft 100;

a second clutch 16, of a normally disengaged type, operable to couple the second input shaft 12 to the drive shaft 100; and an output shaft 18 carrying a final reduction pinion 20.

The first input shaft 10 controls rotation of a drive gearwheel 21 of first gear and a drive gearwheel 23 of third gear which mesh with respective driven gearwheels 31 and 33 mounted idly on the output shaft 18. A first coupling sleeve 41 is fitted between the driven idle wheels 31 and 33 and is selectively movable either to left or right to engage the first and third gear respectively.

In the same way, the second input shaft 12 controls rotation of a drive gearwheel 22 of second gear and of a drive gearwheel 24 of fourth gear, which mesh with driven gearwheels 32 and 34 respectively, mounted idly on the output shaft 18. A second coupling sleeve 42 is fitted between the two driven idle wheels 32 and 34 and is selectively movable either to left or right for engaging the second and fourth gear respectively.

A fifth gear drive gearwheel 25 and a sixth gear drive gearwheel 26 are also mounted idly on the input shaft 10, and mesh with respective driven gearwheels 35 and 36 coupled for rotation with the output shaft 18. A third coupling sleeve 43 is fitted between the two idle driven wheels 25 and 26 and is selectively movable either to left or right for engaging the fifth and sixth gear respectively.

Finally, the first input shaft 10 controls rotation of a reverse drive gearwheel 27 which meshes, by means of an intermediate wheel 28 mounted idly on a lay shaft 29, with a driven gearwheel 37 which is mounted idly on the output shaft 18 and can be coupled for rotation with this shaft by means of a fourth coupling sleeve 44.

Figure 2:
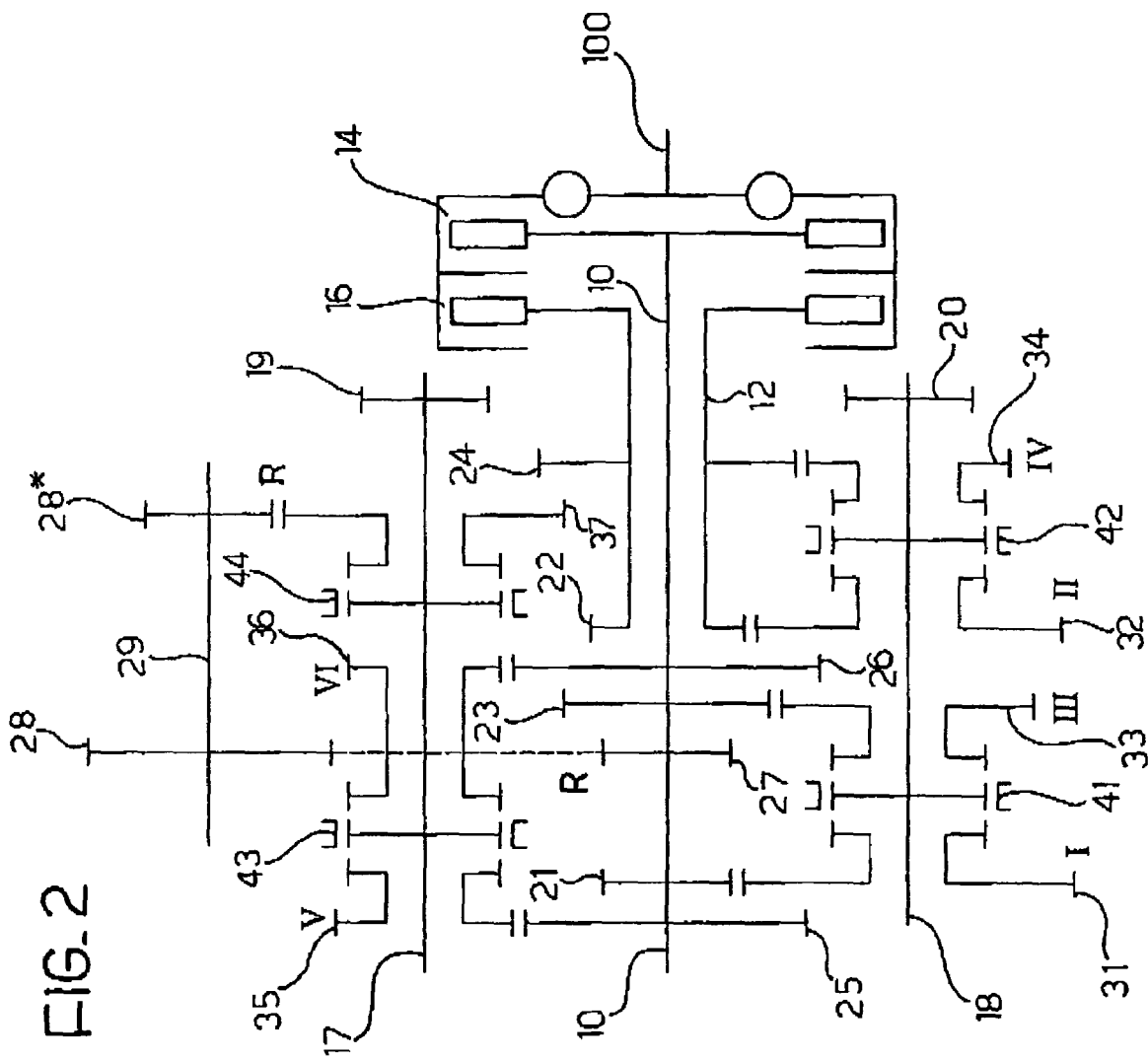
FIG. 2 is a diagram of a second preferred embodiment of a double-clutch six-speed transmission for a motor vehicle according to the invention, with two output shafts.

A second preferred embodiment of the invention is illustrated in FIG. 2, where parts and elements identical or corresponding to those of FIG. 1 have been given the same reference numbers. This embodiment differs from the first substantially in that it also includes a second output shaft 17, carring a second final reduction pinion 19. The configuration with two output shafts clearly offers the advantage of less axial dimensions of the transmission than the configuration with a single shaft.

The gear sets relating to the first four forward gear ratios are arranged as in the first embodiment.

With regard, however, to fifth and sixth gears, the first input shaft 10 controls rotation of the drive gearwheel 25 of fifth gear and the drive gearwheel 26 of sixth gear, which mesh with the driven gearwheels 35 and 36 respectively, mounted idly on the second output shaft 17. The third coupling sleeve 43 is fitted between the two idle driven wheels 35 and 36 and is selectively movable either to left or right to engage the fifth and sixth gear respectively.

Finally, as for fifth and sixth gears, the driven gearwheel 37 of reverse gear is mounted idly on the second output shaft 17 and can be coupled for rotation with this shaft by means of the fourth coupling sleeve 44. In contrast to the first embodiment, the lay shaft 29 carries two gearwheels 28 and 28\*  which mesh with the reverse gear drive gearwheel 27 and the reverse gear driven gearwheel 37, respectively.

Obviously, the two structural arrangements described above can be modified, for each of the gear sets associated with a pair of gear ratios which can be engaged by means of a same coupling sleeve, by idly mounting the gearwheels coupled for rotation with the respective shaft and, vice-versa, coupling the idle wheels for rotation with the respective shaft.

The two configurations described above do not make it possible to shift between the fifth and sixth gears in power-shift mode, since the driven idle wheels 35 and 36 are engageable by the same sleeve 43 and the drive wheels 25 and 26 of fifth and sixth gear are mounted on the same input shaft 10. It is however a limitation which does not, compromise driving comfort since the "jerk" on the vehicle when shifting between the fifth and sixth gears is reduced and therefore barely noticeable by the driver.

The two clutches 14 and 16 are preferably of a dry type, in order to maximize the efficiency of the transmission. On the other hand, by using one normally engaged clutch (for the input shaft which carries the drive wheels of the first and reverse gears) and one normally disengaged clutch, it is possible to eliminate the parking device in contrast to an arrangement with both clutches of a normally disengaged type. Moreover, problems (such as breakage of the gearbox and/or danger to the user) which could occur in the event of a breakdown (electrical, electronic and/or hydraulic fault) during the phase of a gear shift when two gears are engaged at the same time, without the need for adopting a special safety system, which is required in transmissions with both clutches of a normally engaged type.

The two transmission configurations described above have the advantage that they can be obtained easily from a normal single-clutch transmission, in particular a manual transmission (the arrangement most widely used in Europe) but also from a robotised transmission, as can be seen from the diagrams shown in FIGS. 3 to 6, in which parts and components identical to those of the transmissions shown in FIGS. 1 and 2 have been given the same reference numbers increased by 100.

Figure 3:
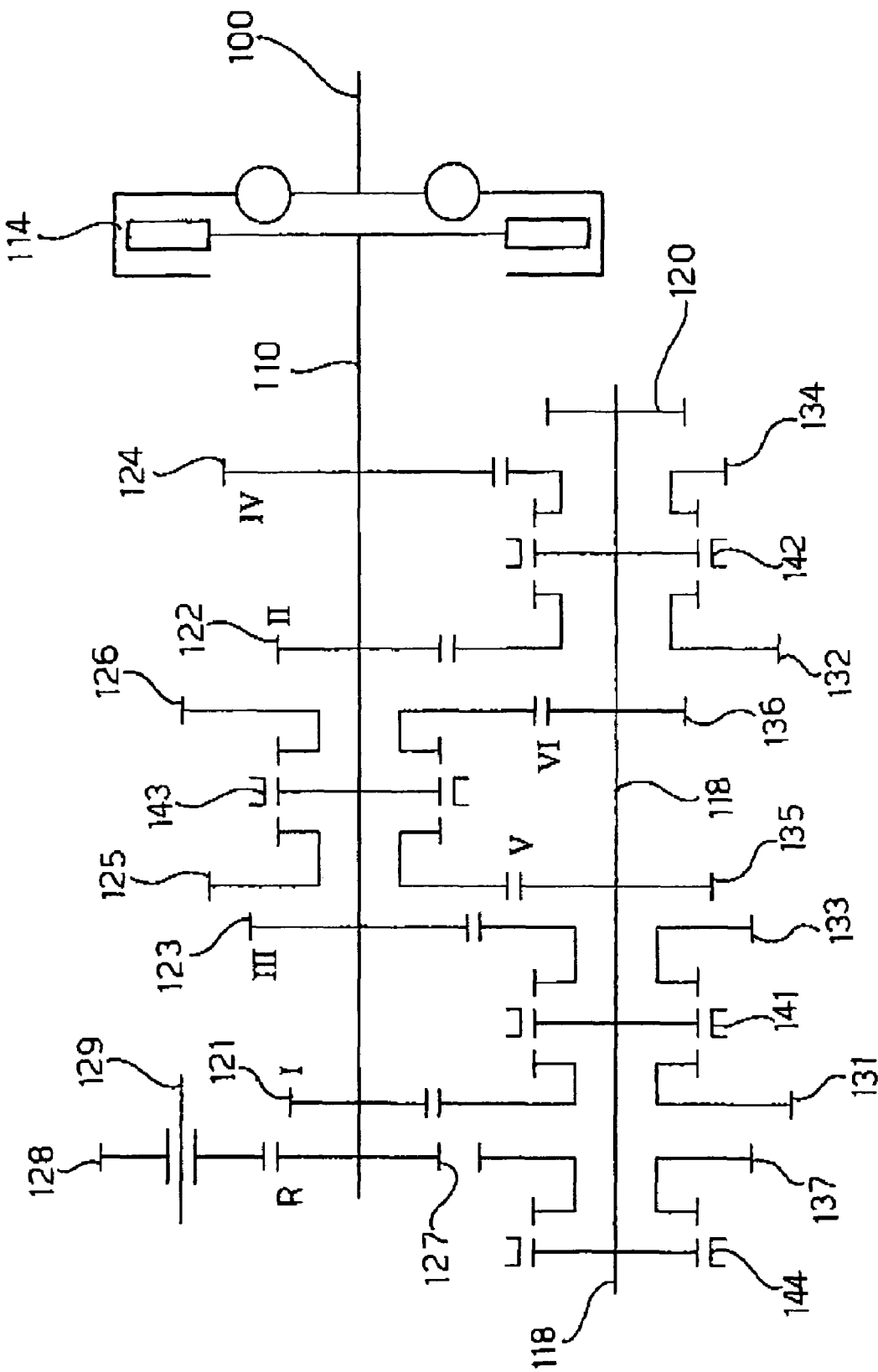
FIG. 3 is a diagram of a single-clutch six-speed transmission, with robotised control, obtainable from the transmission of FIG. 1.
Figure 4:
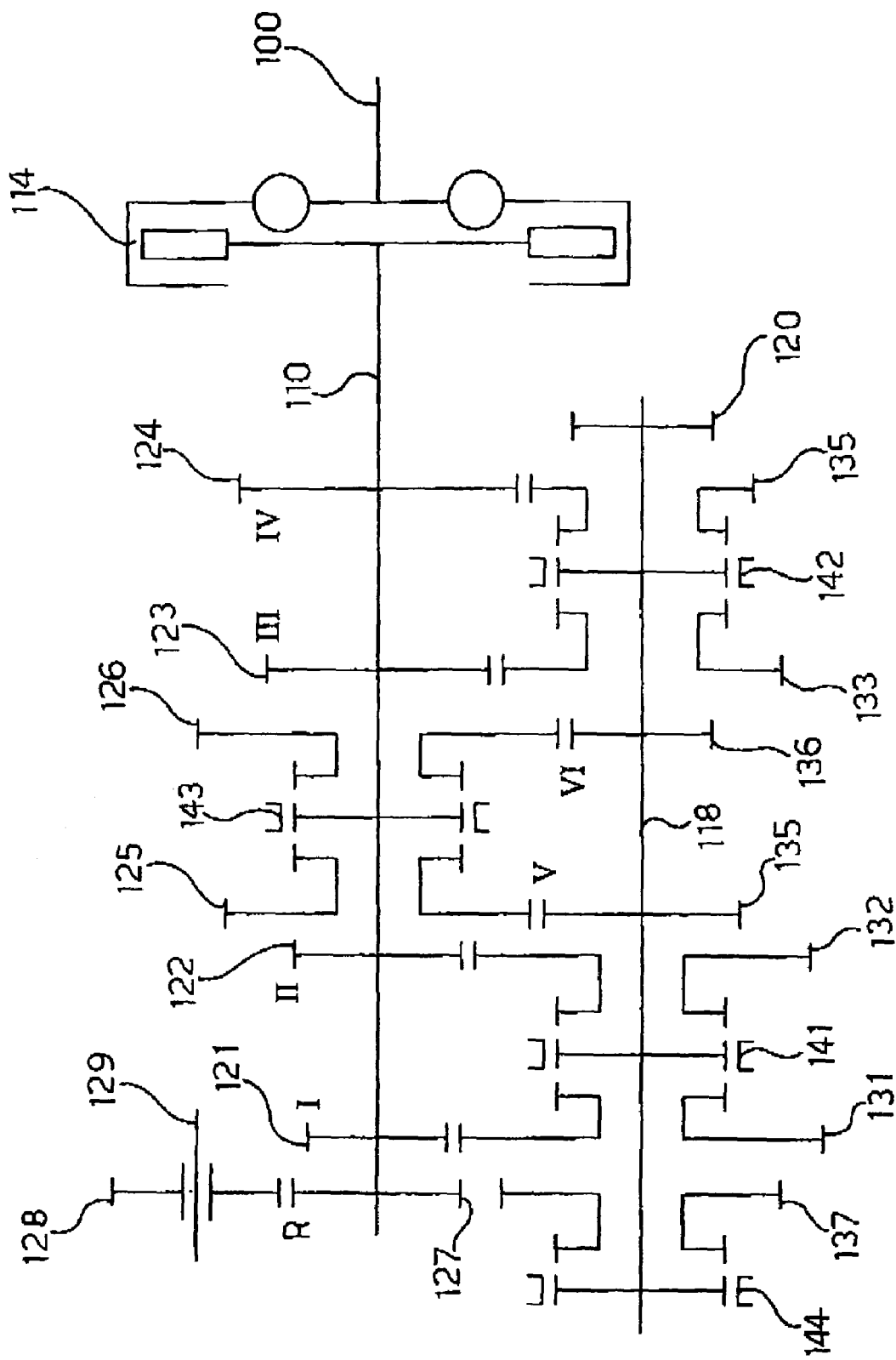
FIG. 4 is a diagram of a single-clutch six-speed transmission, with manual control, obtainable from the transmission of FIG. 1.
Figure 5:
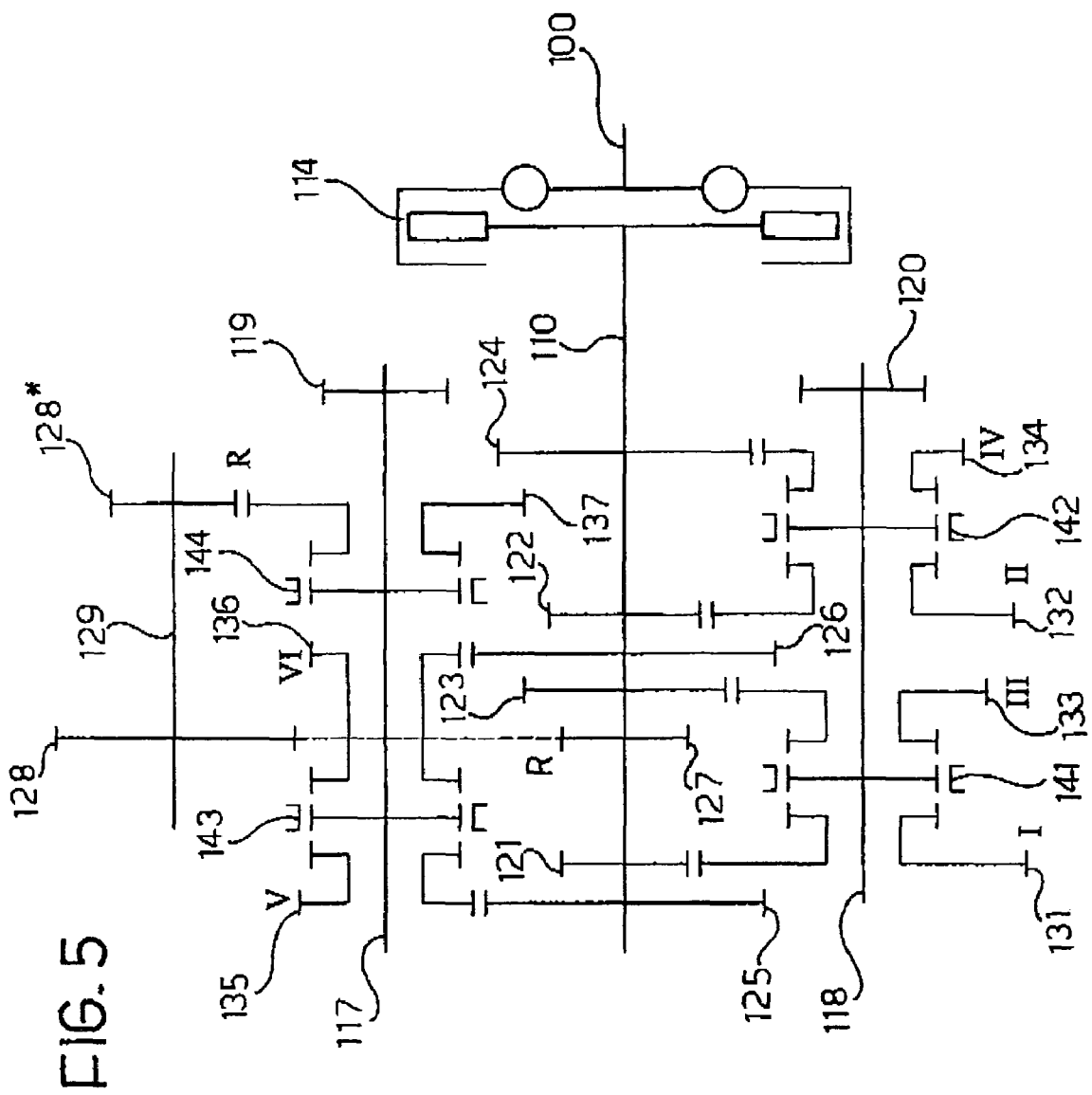
FIG. 5 is a diagram of a single-clutch six-speed transmission, with robotised control, obtainable from the transmission of FIG. 2.
Figure 6:
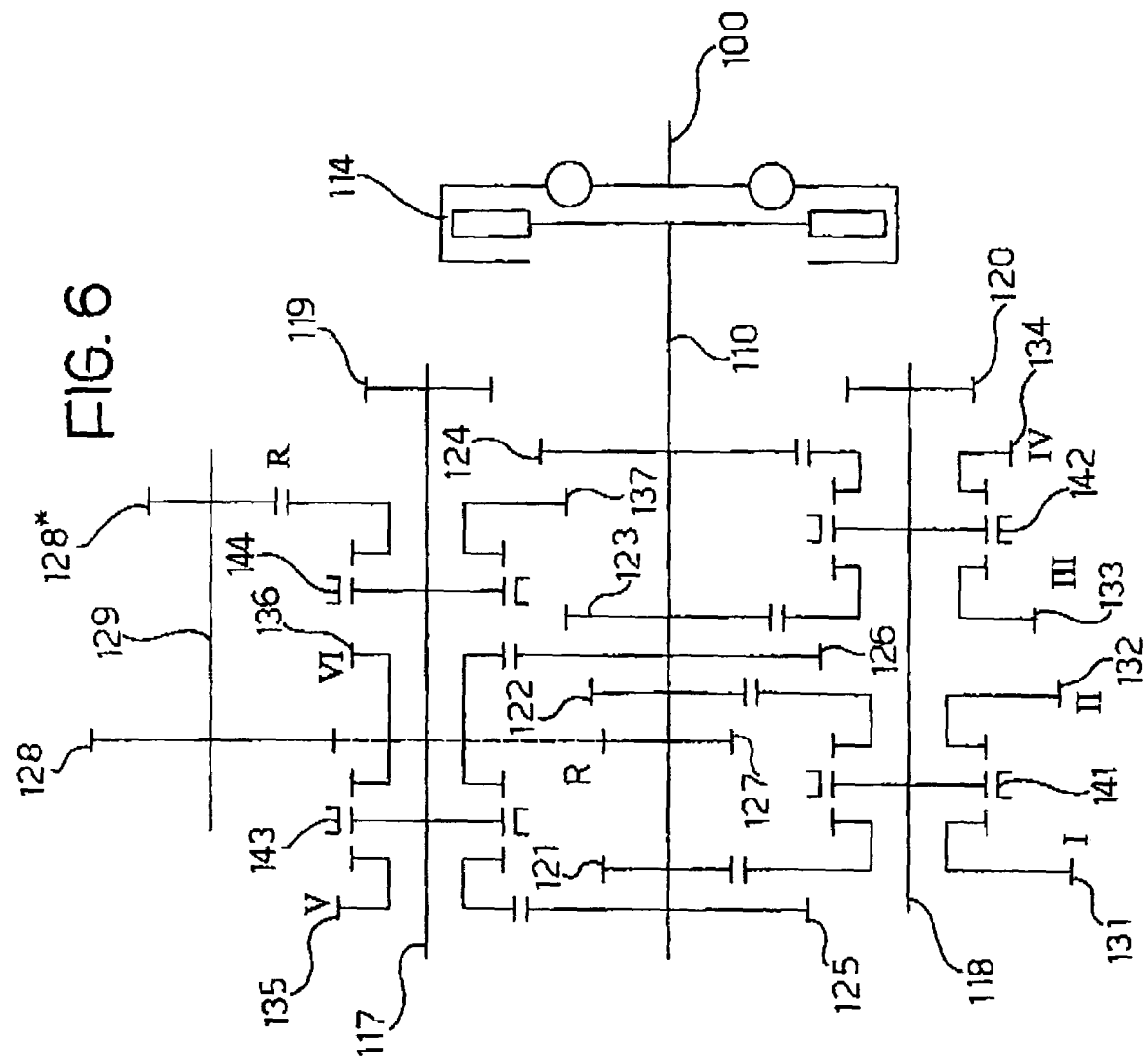
FIG. 6 is a diagram of a single-clutch six-speed transmission, with manual control, obtainable from the transmission of FIG. 2.

FIG. 3 shows a single-clutch six-speed transmission, with robotised control, which can be obtained from the transmission of FIG. 1, simply by joining the two input shafts and thereby eliminating the clutch associated with the second shaft. In order to convert the double-clutch transmission into the single-clutch manual transmission (FIG. 4), one need only reverse the gear sets of the second and third gears, in addition to joining the two input shafts. The same applies to six-speed, single-clutch transmissions with robotised or manual control (shown in FIGS. 5 and 6, respectively), which can be obtained from the transmission of FIG. 2.

In the case of a seven speed transmission, the drive gearwheel of sixth gear will be mounted on the second input shaft (on which the drive wheels associated to the even gears, that is second and fourth, are mounted), and the drive gearwheel of seventh gear will also be mounted on the second input shaft, alongside the sixth gearwheel and will share the coupling sleeve of this latter.

Figure 7:
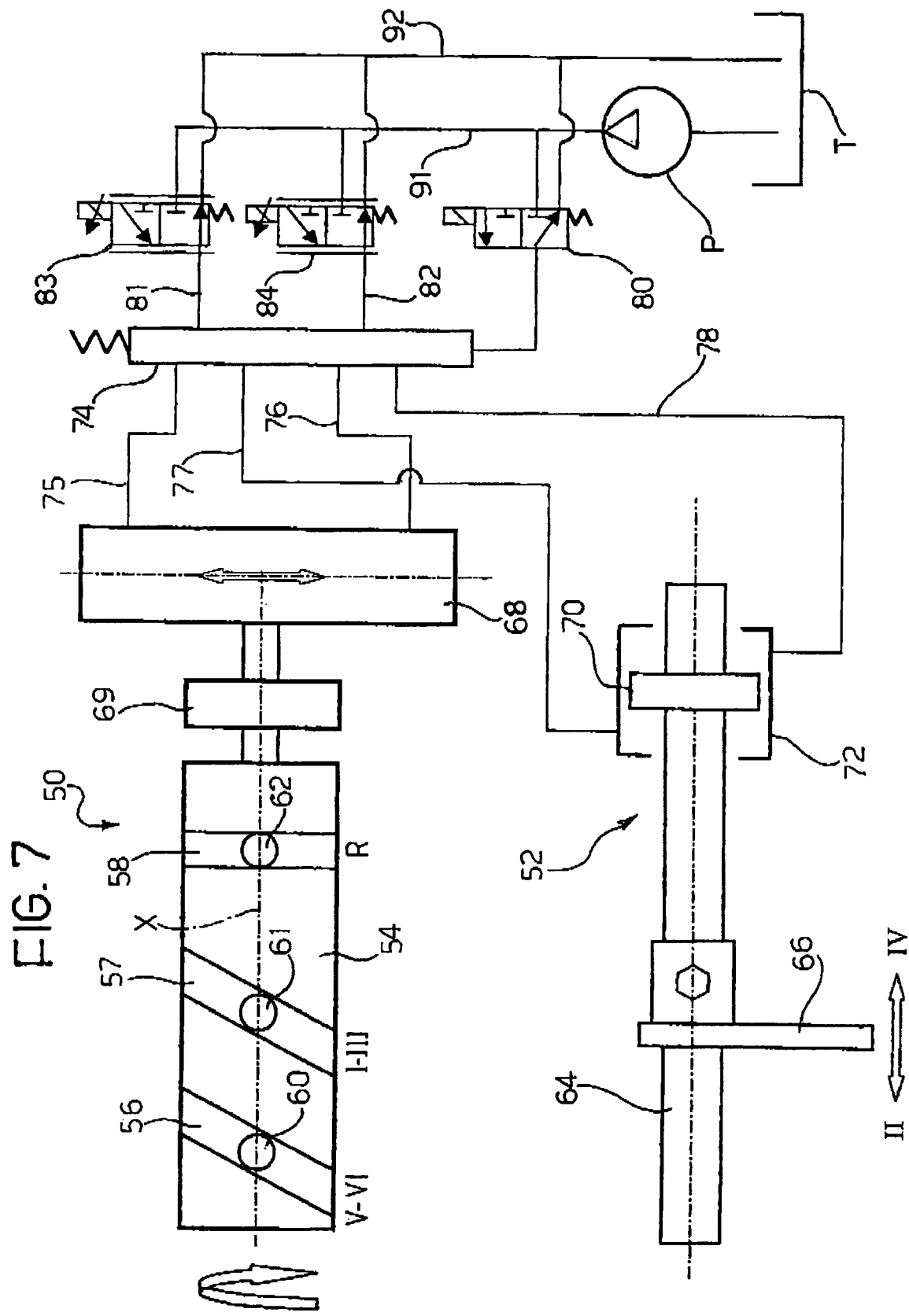
FIG. 7 shows an example of an electrohydraulic control system for a transmission according to the invention.

With reference now to FIGS. 7 and 8, two embodiments will be described of a control system operable to control the movement of the four coupling sleeves 41–44 in a six-speed double clutch transmission according to the invention. The same system could also be used, however, in a robotised six-speed single-clutch transmission.

Both the control systems shown basically include:
- a first control device 50 for controlling movement of the coupling sleeves 41, 43 and 44 associated with the gears controlled by the first input shaft 10 (first, third, fifth, sixth and reverse); and
- a second control device 52 for controlling movement of the coupling sleeve 42 associated with the second and fourth gear, controlled by the second input shaft 12.

The first control device 50 is provided with a drum 54 mounted for rotation about its axis X. Three control grooves 56, 57 and 58 are formed in the cylindrical lateral surface of the drum 54, each engaging a respective pin 60, 61 and 62 for displacing it along the axis X as a result of rotation of the drum. The three pins 60–62 are each connected to a respective fork (not shown) controlling the movement of a respective coupling sleeve. In particular, the pin 60 is connected to the fork controlling the sleeve 43 of fifth and sixth gear, the pin 61 is connected to the fork controlling the sleeve 41 of first and third gear, and the pin 62 is connected to the fork controlling the sleeve 44 of reverse gear.

The second control device 52 is provided with a slidable rod 64 carrying a fork 66 for controlling the movement of the coupling sleeve 42 of second and fourth gear.

In some arrangements of the coupling sleeves 41–44 it is possible to have the three forks controlled by the drum 54 slidable coaxially on the rod 64 carrying the fork 66.

A first embodiment of the transmission control system according to the invention is electrohydraulically operated. With reference to FIG. 7, the first control device 50 includes a linear hydraulic actuator 68 provided with a lever mechanism for converting linear to rotary motion and intended to control rotation of the drum 54 (by means of a ratchet clutch 69), while the second control device 52 includes an hydraulic piston 70 slidable in a cylinder 72 and fast for translation with the slidable rod 64 and the fork 66.

The actuator 68 and the piston-cylinder unit 70, 72 are controlled alternatively by a first proportional solenoid valve 83, which controls the shift to a higher gear (up-shift) and by a second proportional solenoid valve 84 which controls the shift to a lower gear (down-shift). The solenoid valves 83 and 84 modulate pressure of the working liquid supplied by a pump P in a delivery line 91 and alternatively connect a first line 81 and a second line 82 of a six-way distributor 74 with the delivery line 91 of the pump P or with a discharge line 92 to a reservoir T.

The six-way distributor 74 is also connected to the linear hydraulic actuator 68 via a third line 75 and a fourth line 76 and to the cylinder 72 via a fifth line 77 and a sixth line 78. The distributor 74 is controlled by an ON/OFF solenoid valve 80 for switching between:

a first operating position (solenoid valve 80 in OFF position), in which the first and second lines 81, 82 are connected to the third and fourth lines 75, 76 respectively for controlling rotation of the drum 54, by means of the actuator 68 and the ratchet clucth 69, in either clockwise or anti-clockwise direction under the control of the solenoid valves 83 and 84; and a second operating position (solenoid valve 80 in ON position), in which the first and second lines 81, 82 are connected to the fifth and sixth lines 77, 78 respectively for controlling movement of the piston 70 in one direction or the other under the control of the solenoid valves 83 and 84.

Two additional proportional solenoid valves (not shown) are also provided for controlling respective actuators (also not shown) intended to control the two clutches 14 and 16.

A second embodiment of the transmission control system according to the invention is electro-mechanically operated. With reference to FIG. 8, the first control device 50 includes a first electric motor 86 for controlling rotation of the drum 54 (by means of a reduction gear 87, possibly provided with a damper device), while the second control device 52 includes a second electric motor 88 for controlling translation movement of the slidable rod 64 by means of a mechanism for reduction and conversion of rotary motion into linear motion, which includes a pinion 89 and a rack 90 and is possibly provided with a damper device. Alternatively, it is possible to provide a coaxial configuration of the motor 88 and the rod 64, by using a lead screw and nut motion conversion mechanism or a re-circulating-ball arrangement.

Two additional electro-mechanical actuators (not shown) are also provided for controlling the two clutches 14 and 16.

Both the control systems illustrated above, in combination with a double-clutch six-speed transmission according to the invention, make it possible to carry out double or triple gear shifts in power-shift mode during the following down-shift maneuvers:

from sixth to fourth or second;
from fifth to second; and
from fourth to first.

The remaining multiple down-shift maneuvers, for example from fourth to second, can be carried out however in a conventional mode, that is with an interruption in the transmission of torque.

Naturally, the principle of the invention remaining unchanged, embodiments and manufacturing details may vary widely from those described and illustrated purely by way of non-limitative example.

What is claimed is:

1. A double-clutch transmission having at least six speeds, for a motor vehicle, including:

a first input shaft and a second input shaft coaxial to the first;

first and second clutches operable to couple the first and the second input shafts respectively to a drive shaft of the motor vehicle, at least one output shaft;

a plurality of drive gearwheels respectively associated with the forward gear ratios and with the reverse gear, of which a gearwheel of first gear, a gearwheel of third gear, a gearwheel of fifth gear and a gearwheel of reverse gear are carried by the first input shaft, while a gearwheel of second gear and a gearwheel of fourth gear are carried by the second input shaft;

a plurality of driven gearwheels meshing, either directly or indirectly, with the corresponding drive gearwheels and carried by the said at least one output shaft; and coupling sleeves, each operable to connect a drive gearwheel with the respective input shaft or a driven gearwheel with the respective output shaft, for engaging a particular gear ratio;

wherein the drive gearwheels associated with the two highest forward gear ratios are arranged on the same input shaft.

2. The transmission of claim 1, wherein the drive gearwheels associated with the last two forward gear ratios are mounted idly, alongside each other, on the same input shaft.

3. The transmission of claim 1, wherein the driven gearwheels associated with the last two forward gear ratios are mounted idly, alongside each other, on the same output shaft.

4. The transmission of claim 1, having six forward gear ratios and comprising:

a first coupling sleeve associated with the drive or driven gearwheels of the first and third gears;

a second coupling sleeve associated with the drive or driven gearwheels of the second and fourth gears;

a third coupling sleeve associated with the drive or driven gearwheels of the fifth and sixth gears; and a fourth coupling sleeve associated with the drive or driven gearwheel of the reverse gear.

5. The transmission of claim 1, wherein the drive gearwheels of the first and third gears are arranged adjacent to each other.

6. The transmission of claim 1, wherein the driven gearwheels of the first and third gears are mounted idly, alongside each other, on the same output shaft (18).

7. The transmission of claim 1, wherein the driven gearwheels of the second and fourth gears are mounted idly, alongside each other, on the same output shaft.

8. The transmission of claim 1, wherein a lay shaft is also provided, and the driven gearwheel of the reverse gear is mounted idly on the respective output shaft and meshes with the associated drive gearwheel via an intermediate wheel carried by the lay shaft.

9. The transmission of claim 4, wherein first and second output shafts are provided, the driven gearwheels of the first and third gears are mounted idly on the first output shaft so as to be selectively connectable for rotation therewith by means of the first coupling sleeve, the driven gearwheels of the second and fourth gears are mounted idly on the first output shaft so as to be selectively connectable for rotation therewith by means of the second coupling sleeve, and the driven gearwheels of the fifth and sixth gears are mounted idly on the second output shaft so as to be selectively connectable for rotation therewith by means of the third coupling sleeve.

10. The transmission of claim 9, wherein a lay shaft is also provided, and the driven gearwheel of the reverse gear is mounted idly on the second output shaft and is driven to rotate by the associated drive gearwheel via a pair of intermediate gearwheels carried by the lay shaft.

11. The transmission of claim 1, wherein the first clutch is a normally engaged clutch, while the second clutch a normally disengaged clutch.

12. The transmission of claim 1, wherein both the clutches are dry clutches.

13. The transmission of claim 4, further comprising a system for controlling the coupling sleeves which includes:
   a first device operable to control displacement of the first, third and fourth coupling sleeves; and
   a second device operable to control displacement of the second coupling sleeve independently of the first control device.

14. The transmission of claim 13, wherein the first control device is provided with a rotatable drum arranged to control displacement of the first, third and fourth coupling sleeves, and the second control device has a slidable rod for controlling displacement of the second coupling sleeve.

15. The transmission of claim 14, wherein the drum of the first control device has three control grooves, each engaging a pin associated with a respective coupling sleeve.

16. The transmission of claim 14, wherein the slidable rod carries a fork-like control member associated with the second coupling sleeve.

17. The transmission of claim 14, wherein the first control device also includes an hydraulic actuator for controlling rotation of the drum and the second control device also includes an hydraulic piston slidable in a cylinder and fast for translation with the slidable rod.

18. The transmission of claim 17, wherein the control system also includes:
   a pump;
   a reservoir;
   a two-position six-way distributor for connection on one side to the actuator via first and second lines or to the piston via third and fourth lines, and on the other side to the pump and the reservoir via a fifth line and a sixth line; and
   a pair of proportional three-way solenoid valves each disposed in one of the said fifth and sixth lines for controlling connection of the distributor to the pump and to the reservoir, the said solenoid valves being arranged the one to control up-shift and the other to control down-shift.

19. The transmission of claim 14, wherein the first control device also includes a first electric motor for controlling rotation of the drum and the second control device also includes a second electric motor for controlling displacement of the slidable rod by means of a mechanism for converting rotary motion into linear motion.

20. The transmission of claim 19, wherein the mechanism for converting rotary motion into linear motion includes a pinion rotatable by the second electric motor and a rack fast for translation with the slidable rod.

21. The transmission of claim 19, wherein the mechanism for converting rotary motion into linear motion is a lead screw and nut arrangement or a re-circulating ball arrangement.

* * * * *